US011515102B2

(12) United States Patent
Kim

(10) Patent No.: US 11,515,102 B2
(45) Date of Patent: Nov. 29, 2022

(54) SAFETY SHUTTER OF WITHDRAWABLE AIR CIRCUIT BREAKER

(71) Applicant: LS ELECTRIC CO., LTD., Anyang-si (KR)

(72) Inventor: Young-Kook Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/423,626

(22) PCT Filed: Aug. 30, 2019

(86) PCT No.: PCT/KR2019/011152

§ 371 (c)(1),
(2) Date: Jul. 16, 2021

(87) PCT Pub. No.: WO2020/149485

PCT Pub. Date: Jul. 23, 2020

(65) Prior Publication Data

US 2022/0102085 A1 Mar. 31, 2022

(30) Foreign Application Priority Data

Jan. 17, 2019 (KR) ........................ 10-2019-0006158

(51) Int. Cl.
*H01H 9/02* (2006.01)

(52) U.S. Cl.
CPC .................................... *H01H 9/02* (2013.01)

(58) Field of Classification Search
CPC ........ H01H 9/02; H02B 11/24; H02B 11/133; H02B 1/14

(Continued)

(56) References Cited

U.S. PATENT DOCUMENTS 8,604,368 B2 12/2013 Kim et al.
2005/0258922 A1 11/2005 Rowe et al.

(Continued)

FOREIGN PATENT DOCUMENTS

CN 105356350 A 2/2016
JP S4924978 Y1 7/1974

(Continued)

OTHER PUBLICATIONS

European Search Report for related European Application No. 19909829.4; action dated Feb. 11, 2022; (13 pages).

(Continued)

*Primary Examiner* — Edwin A. Leon
*Assistant Examiner* — Iman Malakooti
(74) *Attorney, Agent, or Firm* — K&L Gates LLP

(57) ABSTRACT

A safety shutter of the present disclosure comprises: a base unit; a shutter unit; and a cam unit. The base unit is coupled to a cradle of an air circuit breaker, and a terminal connected to a main circuit passes through the base unit. The shutter unit is coupled to the base unit so as to be spaced apart at a predetermined interval, and accommodates the terminal in the space between the shutter unit and the base unit. The cam unit extends from the base unit and penetrates the shutter unit. The shutter unit deactivates insulation by exposing the terminal in the direction of the air circuit breaker when the air circuit breaker is inserted in the direction of the base unit.

8 Claims, 8 Drawing Sheets

(58) Field of Classification Search
USPC ....... 200/293, 400, 401, 500, 553, 557, 335, 200/337, 339
See application file for complete search history.

(56) References Cited

U.S. PATENT DOCUMENTS

| | | | | |
|---|---|---|---|---|
| 2012/0228095 | A1 | 9/2012 | Kutsche et al. | |
| 2014/0190801 | A1 | 7/2014 | Robarge et al. | |
| 2015/0372460 | A1* | 12/2015 | Faber | H02B 1/14 361/673 |
| 2016/0036204 | A1* | 2/2016 | Schroeder | H02B 11/24 200/50.22 |

FOREIGN PATENT DOCUMENTS

| | | | |
|---|---|---|---|
| JP | 2007209124 | A | 8/2007 |
| KR | 101158645 | B1 | 6/2012 |
| KR | 20170033488 | A | 3/2017 |

OTHER PUBLICATIONS

International Search Report for related International Application No. PCT/KR2019/011152; report dated Jul. 23, 2020 (5 pages).
Written Opinion for related International Application No. PCT/KR2019/011152; report dated Jul. 23, 2020; (4 pages).
Office Action for related Japanese Application No. 2021-540876; action dated Aug. 16, 2022; (6 pages).

* cited by examiner

SAFETY SHUTTER OF WITHDRAWABLE AIR CIRCUIT BREAKER

CROSS-REFERENCE TO RELATED APPLICATIONS

The present application is a National Stage of International Application No. PCT/KR2019/011152 filed on Aug. 30, 2019, which claims the benefit of Korean Patent Application No. 10-2019-0006158, filed on Jan. 17, 2019, filed with the Korean Intellectual Property Office, the entire contents of each hereby incorporated by reference.

FIELD

The present disclosure relates to a safety shutter for an extendable air circuit breaker disposed between a main circuit and the circuit breaker.

BACKGROUND

An air circuit breaker (ACB) device is installed at a low voltage distribution line and breaks a circuit in an arc extinguishing manner in an event of abnormal current such as overcurrent, short circuit or ground fault.

The air circuit breaker may be classified into a fixed type and an extendable type. The fixed air circuit breaker is fixed to a body without separate fixing means. The extendable air circuit breaker is coupled to a cradle and is connected to a main circuit, and is removable from the cradle for inspection or maintenance.

A plurality of terminals connected to the main circuit are arranged on the cradle coupled to the extendable air circuit breaker. When the extendable air circuit breaker retracts into the cradle, each finger of the circuit breaker contacts each terminal.

An inrush current may occur between the terminals and the fingers of the circuit breaker when the circuit breaker retracts or extends into or from the cradle. When an arc caused by the inrush current occurs between the terminals and the fingers of the circuit breaker, the arc may cause a fault in the line. Therefore, an insulating shutter is used to quickly insulate the terminal and the circuit breaker from each other when the circuit breaker retracts or extends into or from the cradle.

A conventional insulating shutter has inconvenience in that a separate actuating lever works to convert the shutter to an insulated or non-insulated mode. In addition, the conventional insulation shutter has a problem in that insulation may not be performed quickly due to the operation of the actuating lever.

In addition, according to the prior art, an insulating shutter has one portion coupled to the circuit breaker and the opposite portion coupled to the cradle, and is automatically opened or closed when the circuit breaker retracts or extends into or from the cradle. However, this insulating shutter has disadvantages in that assembly and disassembly thereof are cumbersome, and the shutter does not respond quickly when the circuit breaker retracts or extends into or from the cradle.

SUMMARY

A purpose of the present disclosure is to provide a safety shutter for an extendable air circuit breaker that may be easily maintained and repaired, and that may quickly activate or deactivate insulation when the circuit breaker retracts or extends into or from a cradle.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

A safety shutter configured to achieve the purpose includes a base unit coupled to a cradle for an air circuit breaker, wherein a terminal connected to a main circuit passes through the base unit; a shutter unit coupled to the base unit while being spaced apart from the base unit by a predetermined spacing, wherein the terminal is accommodated in a space defined between the shutter unit and the base unit; and a cam unit extending from the base unit in a protruding manner, wherein the cam unit passes through the shutter unit.

When the circuit breaker moves toward the base unit and retracts into the cradle, the shutter unit exposes the terminal toward the circuit breaker such that the terminal and the circuit breaker are electrically connected to each other. When the circuit breaker moves away from the base unit and extends from the cradle, the terminal is accommodated in the space between the base unit and the shutter unit such that the terminal and the circuit breaker are electrically insulated from each other.

In one implementation of the safety shutter, the base unit includes: a base plate having at least one opening defined therein through which the terminal passes, wherein the base plate is coupled to the cradle; and at least one the guide member extending from the base plate in a protruding manner along a direction in which the terminal passes through the opening, wherein the shutter unit moves along an extension direction of the guide member.

In one implementation of the safety shutter, the shutter unit includes: a holding plate having each opened or closed hole defined therein through which each terminal passes when the circuit breaker retracts into the cradle; a first plate coupled to the holding plate, wherein the first plate slides in a first direction or a second direction while moving along the cam unit, thereby to open or close a corresponding opened or closed hole; and a second plate coupled to the holding plate, wherein the second plate slides in the second direction or the first direction while moving along the cam unit, thereby to open or close a corresponding opened or closed hole.

In one implementation of the safety shutter, when a speed at which the circuit breaker retracts is equal to a speed at which the circuit breaker extends, the opened or closed hole of the shutter unit is closed in a faster manner than the opened or closed hole thereof is opened.

In one implementation of the safety shutter, the cam unit includes: a first rail constructed to allow the first plate to slide in the second direction along the first rail when the circuit breaker retracts, and to allow the first plate to slide in the first direction along the first rail when the circuit breaker extends; and a second rail constructed to allow the second plate in the first direction along the second rail when the circuit breaker retracts, and to allow the second plate to sidle in the second direction along the second rail when the circuit breaker extends.

In one implementation of the safety shutter, each of the first rail and the second rail includes: an in-cam for guiding the first plate or the second plate to slide in the first direction or the second direction along the in-cam when the circuit breaker retracts; and an out-cam for guiding the first plate or the second plate to slide in the second direction or the first direction along the out-cam when the circuit breaker extends.

In one implementation of the safety shutter, each of the in-cam and the out-cam includes an inclined side face having a predetermined angle relative to an imaginary straight line along a direction in which the circuit breaker retracts or extends, wherein each inclined side face is in contact with at least a portion of the first plate or the second plate to guide the sliding of the first plate or the second plate in the first direction or the second direction.

In one implementation of the safety shutter, an angle defined between the inclined side face of the in-cam and the imaginary straight line along the direction in which the circuit breaker retracts or extends is smaller than an angle defined between the inclined side face of the out-cam and the imaginary straight line.

In one implementation of the safety shutter, each of the first plate and the second plate acts as an electrical insulator.

In one implementation of the safety shutter, the guide member includes: a fixing member coupled to an end of the guide member to fix the shutter unit such that the shutter unit is not separated from the guide member; and an elastic member surrounding the guide member and providing an elastic force to move the shutter unit away from the base unit.

The safety shutter according to the present disclosure has an advantage of quickly activating or deactivating the insulation when the circuit breaker retracts or extends into or from the cradle.

In addition, the safety shutter according to the present disclosure has an effect of quickly activating insulation when the circuit breaker extends from the cradle, thereby preventing occurrence of an arc accident.

Further, according to the present disclosure, the shutter unit may be easily separated from the base unit of the safety shutter, and thus maintenance and repair thereof may be convenient.

The above-described effects, and specific effects of the present disclosure as not mentioned above will be described based on specific details for carrying out the disclosure.

DETAILED DESCRIPTION

Figure 1:
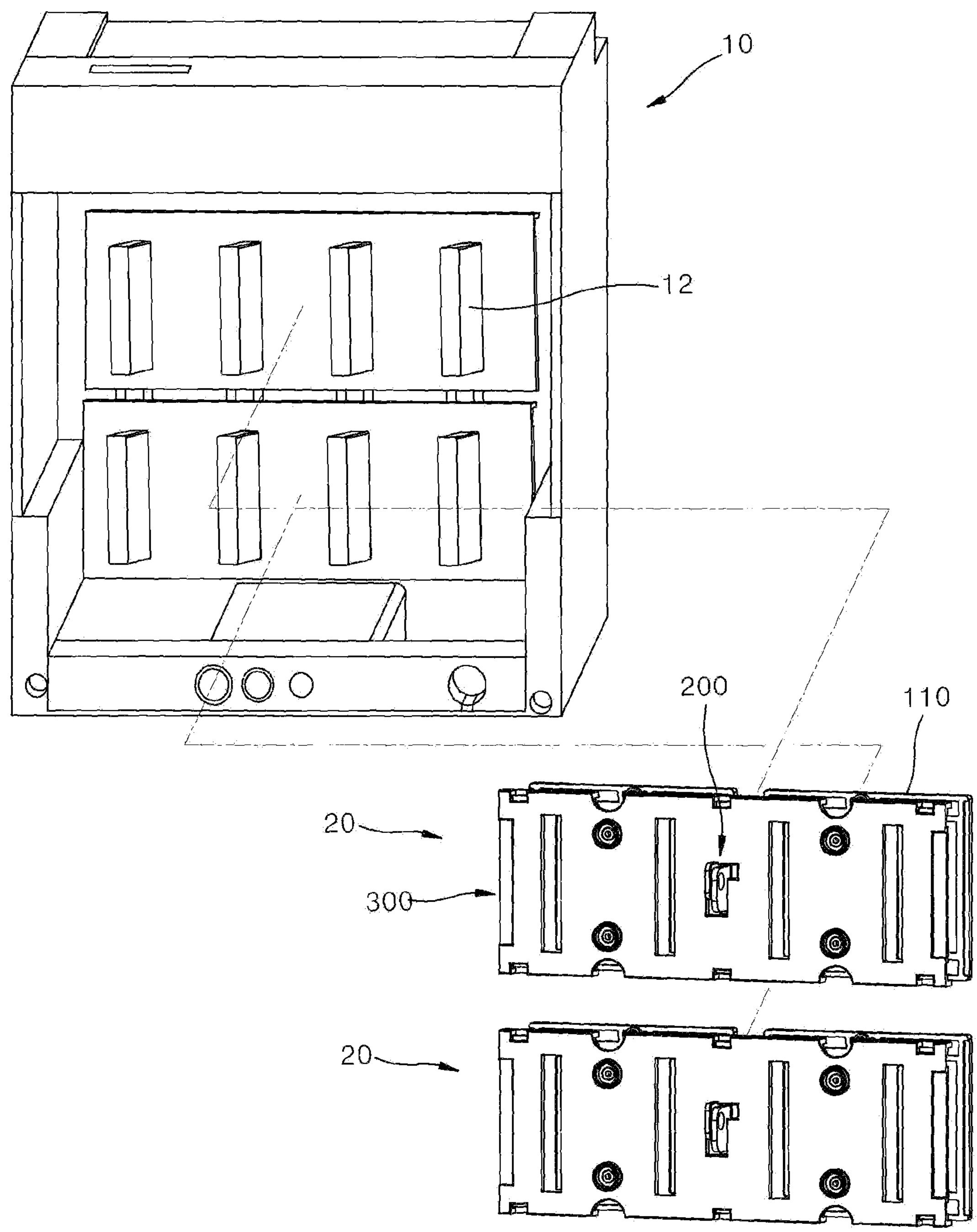
FIG. 1 shows a safety shutter and an extendable air circuit breaker according to an embodiment of the present disclosure.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted.

Hereinafter, a preferred embodiment according to the present disclosure will be described in detail with reference to the accompanying drawings. In the drawings, the same reference numerals are used to indicate the same or similar elements.

Hereinafter, a safety shutter according to some embodiments of the present disclosure will be described.

FIG. 1 shows a safety shutter and an extendable air circuit breaker according to an embodiment of the present disclosure.

As shown in FIG. 1, a safety shutter 20 according to the present disclosure may be coupled to a cradle 10 into which the circuit breaker retracts. In one embodiment of the present disclosure, a front face of the cradle 10 is opened, and thus the circuit breaker retracts into the cradle 10 through the open front face.

A plurality of terminals 12 protruding toward the front face are arranged on an inner face of a rear portion of the cradle 10. The terminal 12 acts as a conductor connected to a main circuit. When the circuit breaker retracts into the cradle 10, each finger of the circuit breaker is electrically connected to each terminal 12.

Figure 2:
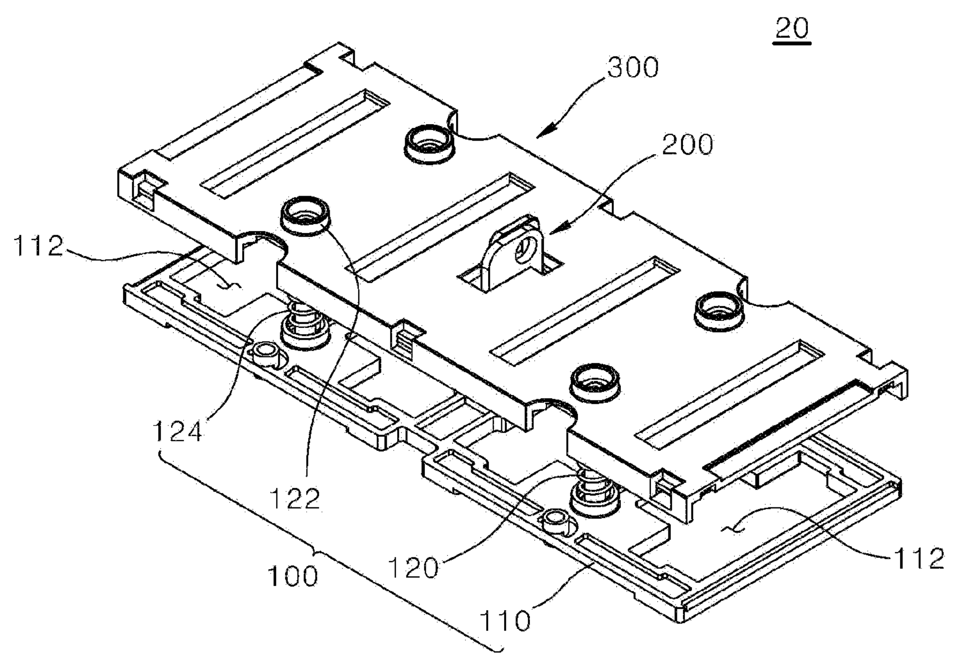
FIG. 2 is a perspective view of a safety shutter according to an embodiment of the present disclosure.
Figure 3:
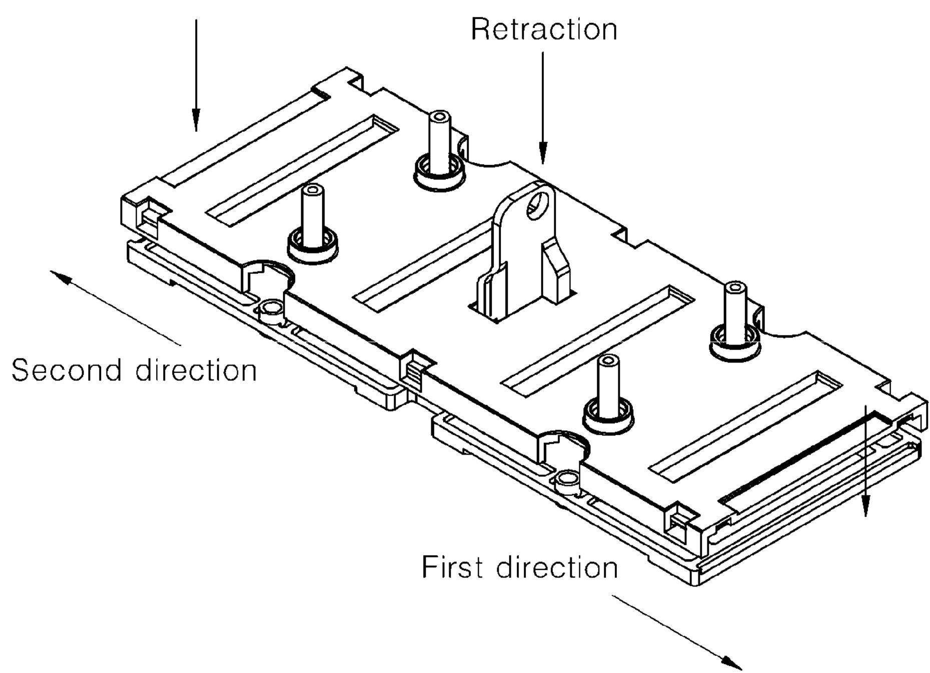
FIG. 3 is a perspective view showing an open state of a safety shutter according to an embodiment of the present disclosure.
Figure 4:
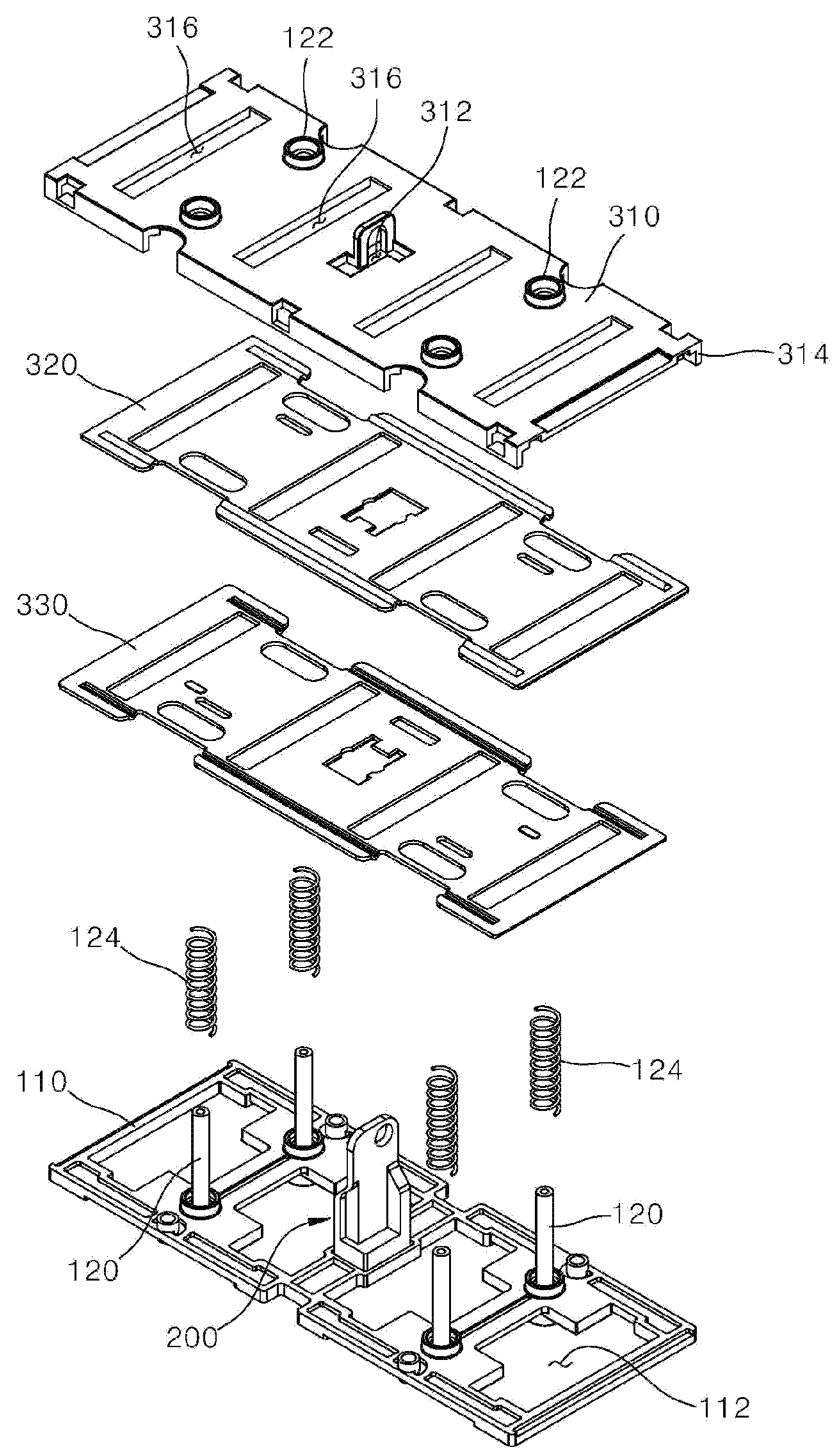
FIG. 4 is an exploded perspective view of a safety shutter according to an embodiment of the present disclosure.

FIG. 2 is a perspective view of a safety shutter according to an embodiment of the present disclosure. FIG. 3 is a perspective view showing an open state of a safety shutter according to an embodiment of the present disclosure. FIG. 4 is an exploded perspective view of a safety shutter according to an embodiment of the present disclosure.

As shown in FIG. 2 to FIG. 4, the safety shutter 20 according to the present disclosure includes a base unit 100, a shutter unit 300, and a cam unit 200.

The base unit 100 is coupled to the cradle 10 for the air circuit breaker. When the safety shutter 20 is coupled to the cradle 10, the terminal 12 connected to the main circuit passes through the base unit 100.

The shutter unit 300 is coupled to the base unit 100 while being spaced apart therefrom by a predetermined spacing. The terminal 12 is accommodated in a space between the shutter unit 300 and the base unit 100.

The cam unit 200 protrudes from the base unit 100. When the base unit 100 and the shutter unit 300 are combined to each other, the cam unit 200 passes through a first cam unit receiving hole formed in the shutter unit 300.

When the circuit breaker retracts toward the base unit 100, the shutter unit 300 may expose the terminal 12 toward the circuit breaker to deactivate insulation. When the circuit breaker extends away from the base unit 100, the terminal 12 may be received in the space between the base unit 100 and the shutter unit 300 to insulate the terminal.

Hereinafter, each of components is described in more detail.

The base unit 100 includes a base plate 110 and a guide member 120.

In an embodiment of the present disclosure, the base plate 110 may be a plate-shaped member. However, the shape of the base plate 110 may vary depending on embodiments. The base plate 110 has an opening 112 defined therein through which the terminal 12 passes.

The guide member 120 protrudes upwardly from the base plate 110. When the shutter unit 300 is coupled to the base plate 110 via the guide member 120, the shutter unit 300 may move along a longitudinal direction of the guide member 120.

The guide member 120 is received in an elastic member 124. One end of the elastic member 124 is in contact with the base plate 110 while the other end thereof is in contact with the shutter unit 300. Therefore, when the base plate 110 and the shutter unit 300 gets closer to each other due to an external force, the elastic member 124 is elastically compressed. Conversely, when the external force is removed, the elastic member 124 pushes the shutter unit 300 away from the base plate 110.

Figure 5:
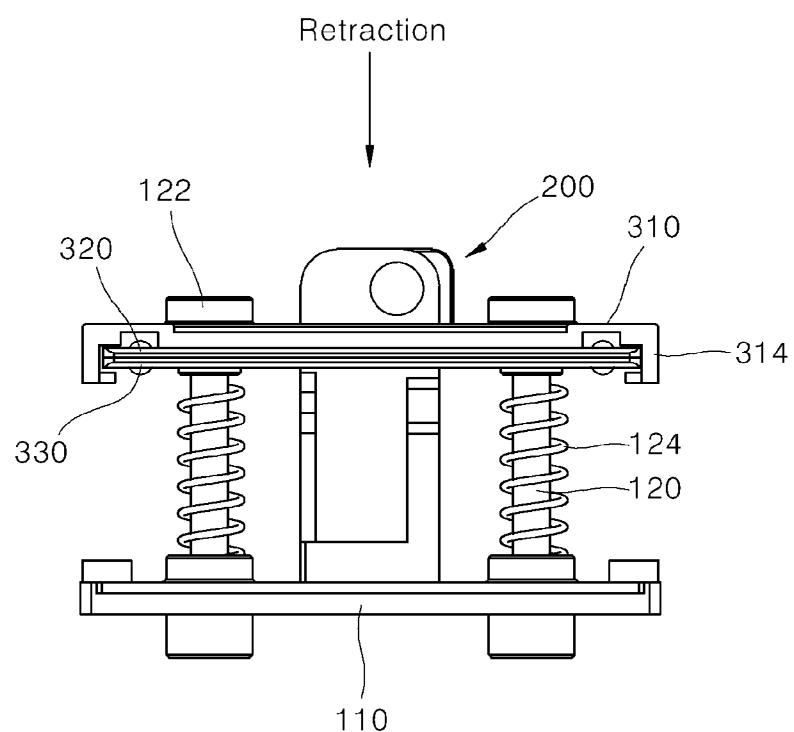
FIG. 5 is a side view of a safety shutter according to an embodiment of the present disclosure.
Figure 6:
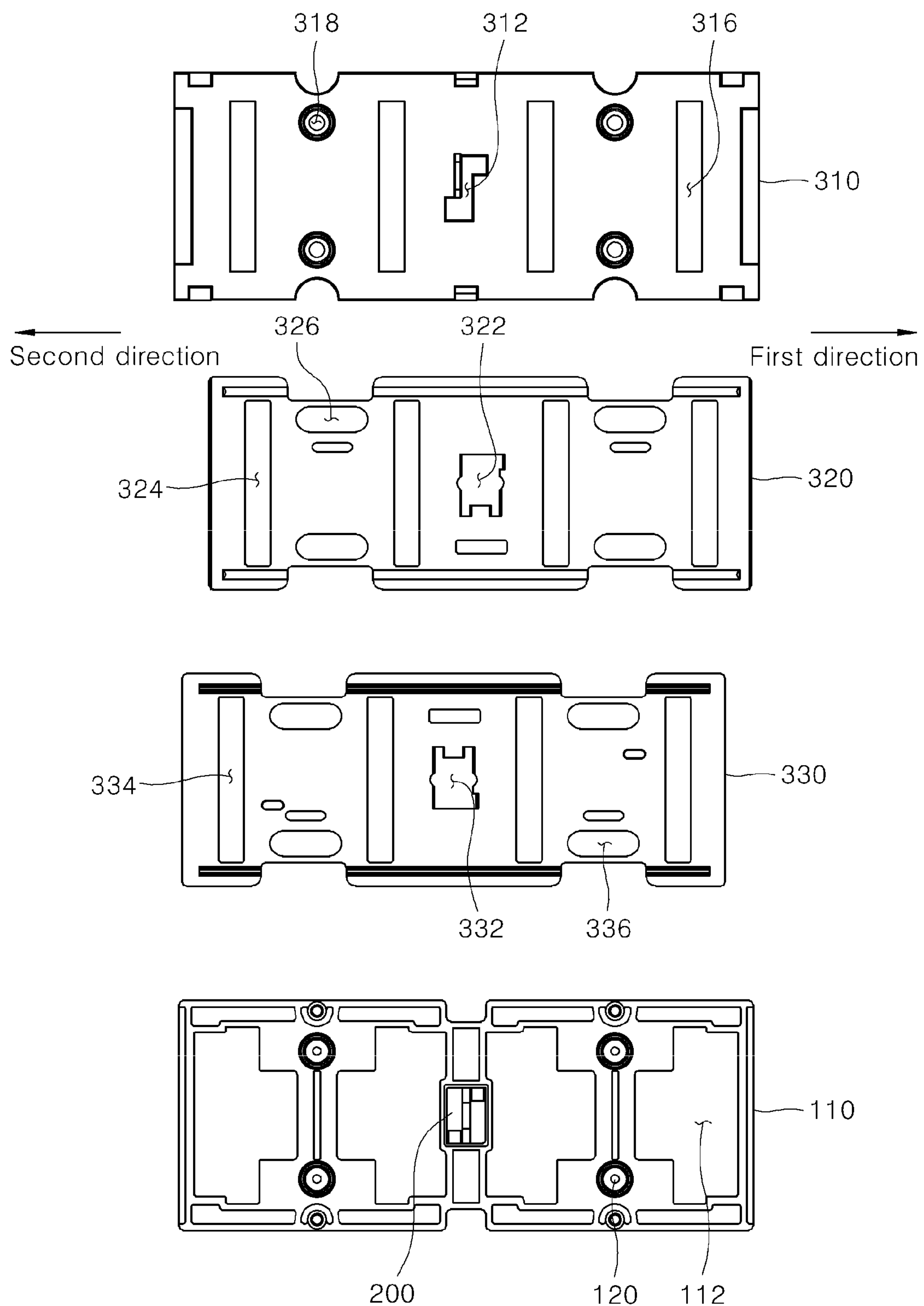
FIG. 6 is an exploded plan view of a shutter unit of a safety shutter according to an embodiment of the present disclosure.
Figure 7A:
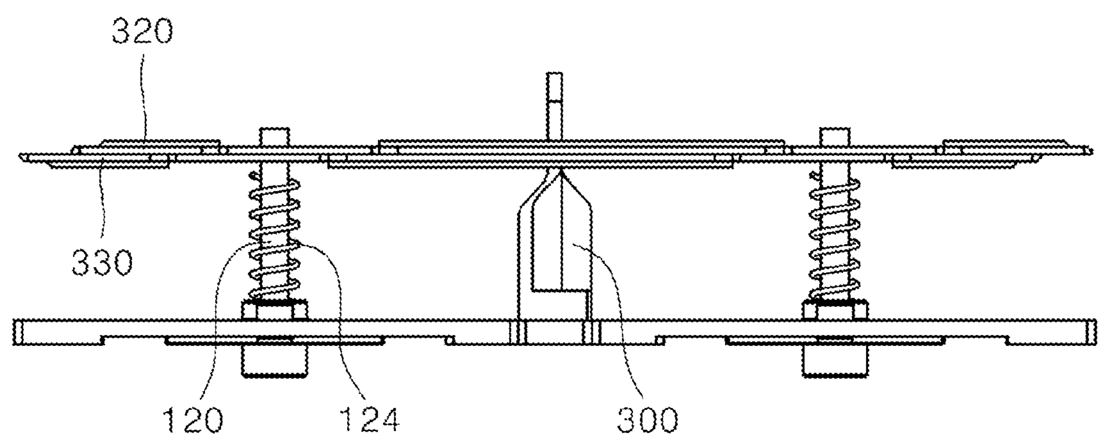
FIGS. 7A and 7B show a state in which a first plate and a second plate of a safety shutter according to an embodiment of the present disclosure move.
Figure 7B:
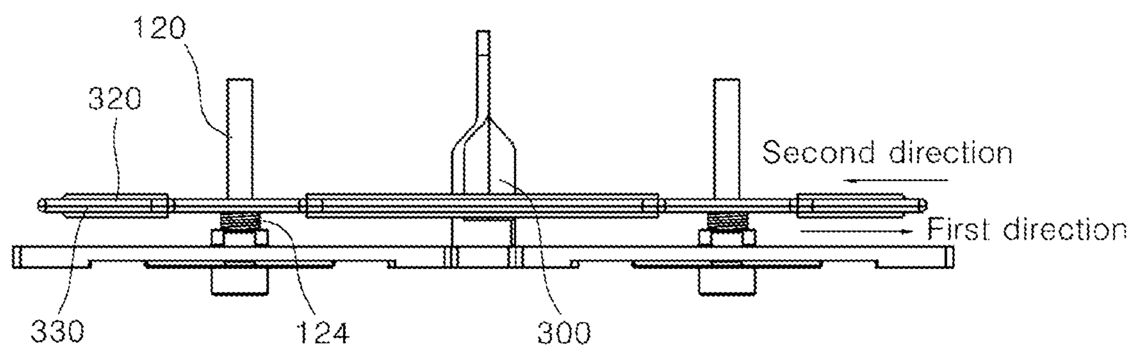
Figure 8:
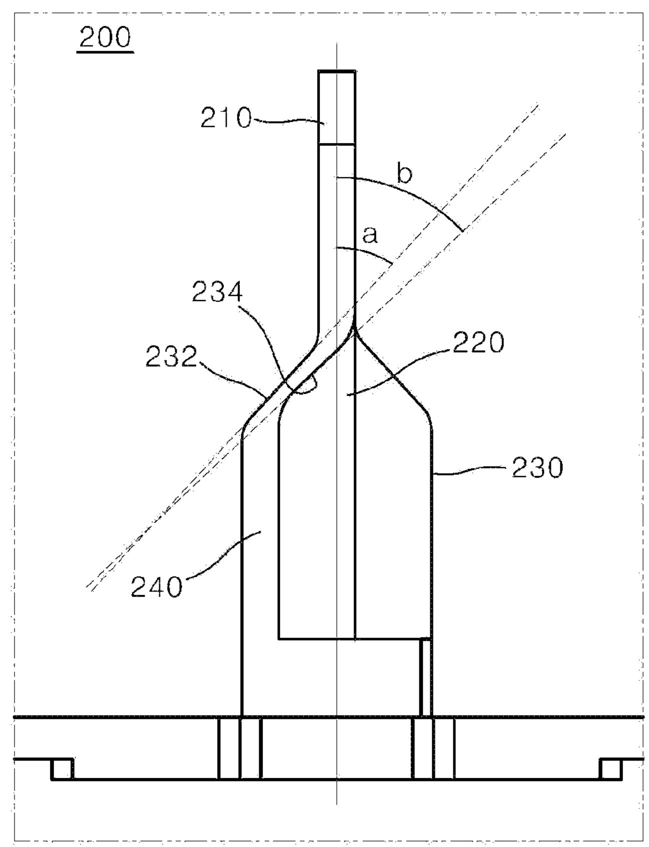
FIG. 8 shows a cam unit of a safety shutter according to an embodiment of the present disclosure.

FIG. 5 is a side view of a safety shutter according to an embodiment of the present disclosure. FIG. 6 is an exploded plan view of a shutter unit of a safety shutter according to an embodiment of the present disclosure. FIGS. 7A and 7B show a state in which a first plate and a second plate of a safety shutter according to an embodiment of the present disclosure moves. FIG. 8 shows a cam unit of a safety shutter according to an embodiment of the present disclosure.

As shown in FIG. 5 and FIG. 6, a fixing member 122 may be coupled to an end of the guide member 120 passing through the shutter unit 300. The fixing member 122 fixes the shutter unit 300 so that the shutter unit 300 moving away from the base plate 110 due to the elastic force of the elastic member 124 is maintained to be spaced from the base plate 110 by a predetermined distance.

The shutter unit 300 includes a holding plate 310, a first plate 320 and a second plate 330. When the holding plate 310 is coupled to the first plate 320 and the second plate 330, each of the first plate 320 and the second plate 330 may slide only in a first direction or a second direction.

The holding plate 310 has a first cam unit receiving hole 312, a shutter rail 314, an opened or closed hole 316 and a coupling hole 318 defined therein.

The first cam unit receiving hole 312 is formed at a position corresponding to a position of the cam unit 200 protruding upwardly from the base plate 110. The first cam unit receiving hole 312 has a planar shape corresponding to a planar shape of the cam unit 200 so that the cam unit 200 may pass through the hole 312 without interference at any vertical level. Specifically, the first cam unit receiving hole 312 has a sufficient size and a shape so that no interference occurs between the cam unit and the holding plate while an entire vertical dimension of the cam unit 200 passes through the hole 312.

The shutter rail 314 accommodates therein the first plate 320 and the second plate 330. The shutter rail 314 provides a path along which each of the first plate 320 and the second plate 330 slides in the first direction or the second direction.

The opened or closed hole 316 is opened or closed by each of the first plate 320 and the second plate 330 when each of the first plate 320 and the second plate 330 slides in the first direction or the second direction.

Specifically, when the circuit breaker retracts into the cradle, the holding plate 310 comes into contact with the circuit breaker and then then moves toward the base plate 110. Thus, the first plate 320 or the second plate 330 comes into contact with and is engaged with a first rail 230 or a second rail 240 of the cam unit 200 which will be described later.

For example, the first plate 320 comes into contact with and is engaged with the first rail 230, and slides in the second direction while moving along an inclined face of the first rail 230. Further, the second plate 330 comes into contact with and is engaged with the second rail 240, and slides in the first direction while moving along an inclined surface of the second rail 240.

When the first plate 320 and the second plate 330 slide in opposite directions, each of a first opening 324 and a second opening 334 are aligned with each of the opened or closed holes 316, and thus each of the opened or closed holes 316 is opened. Accordingly, each of the terminal 12 passes through each of the opened or closed holes 316 and protrudes forwardly of the holding plate 310.

To the contrary, when the circuit breaker extends from the cradle, the holding plate 310 moves away from the base plate 110.

Therefore, on the contrary to a case when the circuit breaker retracts into the cradle, the first plate 320 comes into contact with and is engaged with the first rail 230, and slides in the first direction while moving along the inclined surface of the first rail 230. At the same time, the second plate 330 comes into contact with and is engaged with the second rail 24 and slides in the second direction while moving along the inclined surface formed on the second rail 240.

When the circuit breaker extends from the cradle and the holding plate 310 moves away from the base plate 110, each of the first plate 320 and the second plate 330 returns to each of original positions thereof. Thus, the opened or closed holes 316 are respectively misaligned with the first opening 324 and the second opening 334. Accordingly, each of a portion of the first plate 320 and a portion of the second plate 330 closes each of the opened or closed holes 316.

In summary, when the circuit breaker retracts into the cradle, each opened or closed hole 316 is opened. Each terminal 12 passes through each open opened or closed hole 316 and protrudes forwardly of the holding plate 310.

When the circuit breaker extends from the cradle, each of the opened or closed holes 316 is closed. Just before the opened or closed hole 316 is closed, the terminal 12 moves rearwardly of the shutter unit 300. This expression is intended to simplify the description. However, precisely, the terminal 12 is fixed, and the shutter unit 300 moves forwards so that the terminal 12 is accommodated in the space between the shutter unit 300 and the base unit 100.

The coupling hole 318 acts as a passage through which the guide member 120 passes. When the holding plate 310 moves toward or away from the base plate 110, the guide member 120 moves within the coupling hole 318.

The first plate 320 and the second plate 330 have the same configuration. Further, each of the first plate 320 and the second plate 330 acts an insulator. However, positions in the first plate 320 and the second plate 330 at which a second cam unit receiving hole 322 and a third cam unit receiving hole 332 are formed respectively are different from each other.

The first plate 320 has the second cam unit receiving hole 322, the first opening 324 and a first elongate hole 326 defined therein.

The second plate 330 has the third cam unit receiving hole 332, the second opening 334 and a second elongate hole 336 defined therein.

The second cam unit receiving hole 322 allows the first plate 320 to slide in the first direction or the second direction while moving along the inclined surface of the first rail 230 of the cam unit 200.

Further, the first rail 230 of the cam unit 200 includes an in-cam 232 that the second cam unit receiving hole 322 contacts when the circuit breaker retracts from the cradle and an out-cam 234 that the second cam unit receiving hole 322 contacts when the circuit breaker extends from the cradle.

Each of the in-cam 232 and the out-cam 234 is embodied as each of the inclined side surfaces of the cam unit 200 having a predetermined angle. Accordingly, the second cam unit receiving hole 322 is formed by opening at least a portion of the first plate 320 and is in contact with the first rail 230 of the cam unit 200 and moves along the inclined surface of the first rail 230. Accordingly, the first plate 320 slides in the first direction or the second direction.

The first opening 324 may have the same size and shape as the opened or closed hole 316. Alternatively, the first opening 324 may have a sufficient size and shape such that the terminal 12 may pass through the opening 324 while not interfering with the opening 324.

The first plate 320 and the second plate 330 are coupled to the holding plate 310 so that the first opening 324 does not overlap with the second opening 334. Therefore, the opened or closed hole 316 is closed when the circuit breaker extends from the cradle.

As described above, when the circuit breaker retracts into the cradle, the first opening 324, the second opening 334, and the opened or closed hole 316 are aligned with each other, such that the opened or closed hole 316 is opened.

The first elongate hole 326 extends to have a predetermined length along the sliding direction of each of the first plate 320 and the second plate 330. The guide member 120 passes through the first elongate hole 326. Each first elongate hole 326 has the predetermined length so that each of the first plate 320 and the second plate 330 may slide without interfering with the guide member 120 while the circuit breaker retracts or extends into or from the cradle.

The third cam unit receiving hole 332, second opening 334 and second elongate hole 336 included in the second plate 330 have the same configurations as those included in the first plate 320.

As shown in FIG. 7A, FIG. 7B and FIG. 8, the opened or closed hole 316 is opened or closed by each of the first plate 320 and the second plate 330 while each of the first plate 320 and the second plate 330 slides.

When the opened or closed hole 316 is opened, the insulation is deactivated. When the opened or closed hole 316 is closed, the insulation is activated.

The cam unit 200 may be divided into a closing area 210 and an opening area 220.

As shown in FIG. 8, the closing area 210 refers to a section where the shutter unit 300 stays in the closed state of the opened or closed hole 316.

The opening area 220 refer to a section where the shutter unit 300 stays in the open state of the opened or closed hole 316.

When the opened or closed hole 316 is opened, the terminal 12 passes through the opened or closed hole 316 and protrudes forwardly.

As described above in describing the coupling relationship between the cam unit 200 and the shutter unit 300, the cam unit 200 includes the first rail 230 and the second rail 240.

Each of the first rail 230 and the second rail 240 include the in-cam 232 and the out-cam 234.

The in-cam 232 may has the inclined surface that guides the first plate 320 or the second plate 330 when the circuit breaker retracts into the cradle. Further, the out-cam 234 may has the inclined surface that guides the first plate 320 or the second plate 330 when the circuit breaker extend from the cradle.

The inclined surface of each of the in-cam 232 and the out-cam 234 defines a predetermined angle relative to an imaginary straight line drawn along a direction in which the shutter unit 300 moves or an imaginary straight line drawn along a direction in which the circuit breaker retracts or extends.

In this connection, an angle “a” between the inclined surface of the in-cam 232 and the imaginary straight line along the direction in which the circuit breaker retracts or extends is determined such that when the first plate 320 or the second plate 330 is in contact with the inclined surface, a friction force is lower and the first plate 320 or the second plate 330 slides smoothly. Specifically, “a” may be smaller than 45 degrees.

However, an angle “b” between the inclined surface of the out-cam 234 and the imaginary straight line along the direction in which the circuit breaker retracts or extends is larger than the angle “a”.

Under this configuration, when the circuit breaker extends from the cradle, the opened or closed hole 316 is quickly closed because the out-cam 234 is involved in the opening and closing of the opened or closed hole 316. Therefore, when the circuit breaker extends, a time for which the terminal 12 is in the non-insulated state may be reduced.

The safety shutter according to the present disclosure may reduce the inrush current between the terminal 12 and the circuit breaker and the occurrence of arc due to the inrush current.

As described above, the present disclosure has been described with reference to the illustrated drawings. However, the present disclosure is not limited to the embodiments and drawings disclosed in the present specification. It is obvious that various modifications may be made by those skilled in the art within the scope of the technical idea of the present disclosure. In addition, it is natural that although in the description of the embodiment of the present disclosure, the effect of the configuration of the present disclosure has not been explicitly described, predictable effects of the configuration may be recognized.

What is claimed is:

1. A safety shutter comprising:

a base unit coupled to a cradle for an air circuit breaker, wherein a terminal connected to a main circuit passes through the base and the base unit includes:

a base plate having at least one opening defined therein through which the terminal passes, wherein the base plate is coupled to the cradle; and a guide member extending from the base plate in a protruding manner along a direction in which the terminal passes through the opening;

a shutter unit coupled to the base unit while being spaced apart from the base unit by a predetermined spacing, wherein the terminal is accommodated in a space defined between the shutter unit and the base unit, wherein the shutter unit moves along an extension direction of the guide member, and the shutter unit includes:

a holding plate having each opened or closed hole defined therein through which each terminal passes when the air circuit breaker retracts into the cradle;

a first plate coupled to the holding plate; and a second plate coupled to the holding plate; and a cam unit extending from the base unit in a protruding manner, wherein the cam unit passes through the shutter unit, wherein the first plate of the shutter unit slides in a first direction or a second direction while moving along the cam unit, thereby to open or close a corresponding opened or closed hole, wherein the second plate of the shutter unit slides in the second direction or the first direction while moving along the cam unit, thereby to open or close a corresponding opened or closed hole, wherein when the air circuit breaker moves toward the base unit and retracts into the cradle, the shutter unit exposes the terminal toward the air circuit breaker such that the terminal and the air circuit breaker are electrically connected to each other, and wherein when the air circuit breaker moves away from the base unit and extends from the cradle, the terminal is accommodated in the space between the base unit and the shutter unit such that the terminal and the air circuit breaker are electrically insulated from each other.

2. The safety shutter of claim 1, wherein when a speed at which the air circuit breaker retracts is equal to a speed at which the air circuit breaker extends, the opened or closed hole of the shutter unit is closed in a faster manner than the opened or closed hole thereof is opened.

3. The safety shutter of claim 1, wherein the cam unit includes: a first rail constructed to allow the first plate to slide in the second direction along the first rail when the air circuit breaker retracts, and to allow the first plate to slide in the first direction along the first rail when the air circuit breaker extends; and a second rail constructed to allow the second plate to slide in the first direction along the second rail when the air circuit breaker retracts, and to allow the second plate to slide in the second direction along the second rail when the air circuit breaker extends.

4. The safety shutter of claim 3, wherein each of the first rail and the second rail includes:

an in-cam for guiding the first plate or the second plate to slide in the first direction or the second direction along the in-cam when the air circuit breaker retracts; and an out-cam for guiding the first plate or the second plate to slide in the second direction or the first direction along the out-cam when the air circuit breaker extends.

5. The safety shutter of claim 4, wherein each of the in-cam and the out-cam includes an inclined side face having a predetermined angle relative to an imaginary straight line along a direction in which the air circuit breaker retracts or extends, wherein each inclined side face is in contact with at least a portion of the first plate or the second plate to guide the sliding of the first plate or the second plate in the first direction or the second direction.

6. The safety shutter of claim 5, wherein an angle defined between the inclined side face of the in-cam and the imaginary straight line along the direction in which the air circuit breaker retracts or extends is smaller than an angle defined between the inclined side face of the out-cam and the imaginary straight line.

7. The safety shutter of claim 1, wherein each of the first plate and the second plate acts as an electrical insulator.

8. The safety shutter of claim 1, wherein the guide member includes:

a fixing member coupled to an end of the guide member to fix the shutter unit such that the shutter unit is not separated from the guide member; and an elastic member surrounding the guide member and providing an elastic force to move the shutter unit away from the base unit.

* * * * *